US011405231B2

(12) United States Patent
Kim et al.

(10) Patent No.: US 11,405,231 B2
(45) Date of Patent: Aug. 2, 2022

(54) DATA LEARNING SERVER, AND METHOD FOR GENERATING AND USING LEARNING MODEL THEREOF

(71) Applicant: Samsung Electronics Co., Ltd., Suwon-si (KR)

(72) Inventors: Tae-duk Kim, Yongin-si (KR); Sang-jin Tae, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/756,590

(22) PCT Filed: Oct. 2, 2018

(86) PCT No.: PCT/KR2018/011700
§ 371 (c)(1),
(2) Date: Apr. 16, 2020

(87) PCT Pub. No.: WO2019/078515
PCT Pub. Date: Apr. 25, 2019

(65) Prior Publication Data
US 2020/0244476 A1 Jul. 30, 2020

(30) Foreign Application Priority Data
Oct. 18, 2017 (KR) .................. 10-2017-0135070

(51) Int. Cl.
*G06F 15/173* (2006.01)
*H04L 12/28* (2006.01)
(Continued)

(52) U.S. Cl.
CPC ........ *H04L 12/2825* (2013.01); *G06K 9/6256* (2013.01); *G06N 20/00* (2019.01);
(Continued)

(58) Field of Classification Search
None
See application file for complete search history.

(56) References Cited

U.S. PATENT DOCUMENTS 6,772,096 B2    8/2004  Murakami et al.
2002/0128728 A1*  9/2002  Murakami .......... H04L 41/0677
                                              700/10
(Continued)

FOREIGN PATENT DOCUMENTS

JP    2004-214785 A    7/2004
JP       4149178 B2    9/2008
(Continued)

OTHER PUBLICATIONS

International Search Report dated Jan. 11, 2019 in connection with International Patent Application No. PCT/KR2018/011700, 2 pages.
(Continued)

*Primary Examiner* — Brian Whipple
*Assistant Examiner* — Gregory P Tolchinsky

(57) ABSTRACT

Disclosed is a data learning server according to an embodiment. The data learning server includes a communicator configured to be communicable with an external device, a learning data acquisition unit configured to acquire production information of a home appliance and operation information using the communicator, a model learning unit configured to generate or update a learning model using the product information and the operation information, and a storage configured to store a learning model trained to estimate a new trouble detection pattern related to the trouble item as a result of the generating or updating learning model. Various embodiments are available.
The data learning server may estimate a new trouble detection pattern related to a trouble of a home appliance using rule-based or AI algorithm. When estimating a region of
(Continued)

interest using the AI algorithm, the data learning server may use machine learning, neural network, or deep learning algorithm.

12 Claims, 11 Drawing Sheets

(51) Int. Cl.
  *H04W 4/33* (2018.01)
  *H04W 4/029* (2018.01)
  *G06N 20/00* (2019.01)
  *G06K 9/62* (2022.01)

(52) U.S. Cl.
  CPC ............. *H04W 4/029* (2018.02); *H04W 4/33* (2018.02); *H04L 2012/285* (2013.01)

(56) References Cited

U.S. PATENT DOCUMENTS

| | | | |
|---|---|---|---|
| 2013/0027220 A1* | 1/2013 | Marwah | H04Q 9/00 340/870.16 |
| 2014/0130111 A1* | 5/2014 | Nulty | H04L 41/0631 725/107 |
| 2014/0375547 A1* | 12/2014 | Katz | G06F 3/0346 345/156 |
| 2016/0246269 A1 | 8/2016 | Ahmed et al. | |
| 2017/0315855 A1* | 11/2017 | Doblander | G06F 11/0736 |

FOREIGN PATENT DOCUMENTS

| | | |
|---|---|---|
| JP | 5413240 B2 | 2/2014 |
| JP | 2016-173782 A | 9/2016 |
| KR | 10-2009-0000592 A | 1/2009 |
| KR | 10-2013-0017352 A | 2/2013 |
| KR | 10-1249902 B1 | 4/2013 |
| KR | 10-2016-0109913 A | 9/2016 |
| KR | 10-2017-0031985 A | 3/2017 |
| KR | 10-2017-0077663 A | 7/2017 |
| WO | 2016/079634 A1 | 5/2016 |

OTHER PUBLICATIONS

Written Opinion of the International Searching Authority dated Jan. 11, 2019 in connection with International Patent Application No. PCT/KR2018/011700, 5 pages.

Supplementary European Search Report dated May 4, 2020 in connection with European Patent Application No. 18 86 8442, 7 pages.

European Patent Office, "Communication pursuant to Article 94(3) EPC", dated Sep. 24, 2021, in connection with European Patent Application No. 18868442.7, 9 pages.

Korean Intellectual Property Office, "Notice of Preliminary Rejection," dated Mar. 18, 2022, in connection with Korean Patent Application No. 10-2017-0135070, 17 pages.

European Patent Office, "Communication pursuant to Article 94(3) EPC," dated May 31, 2022, in connection with European Patent Application No. 18868442.7, 6 pages.

\* cited by examiner

<u>30</u>

30

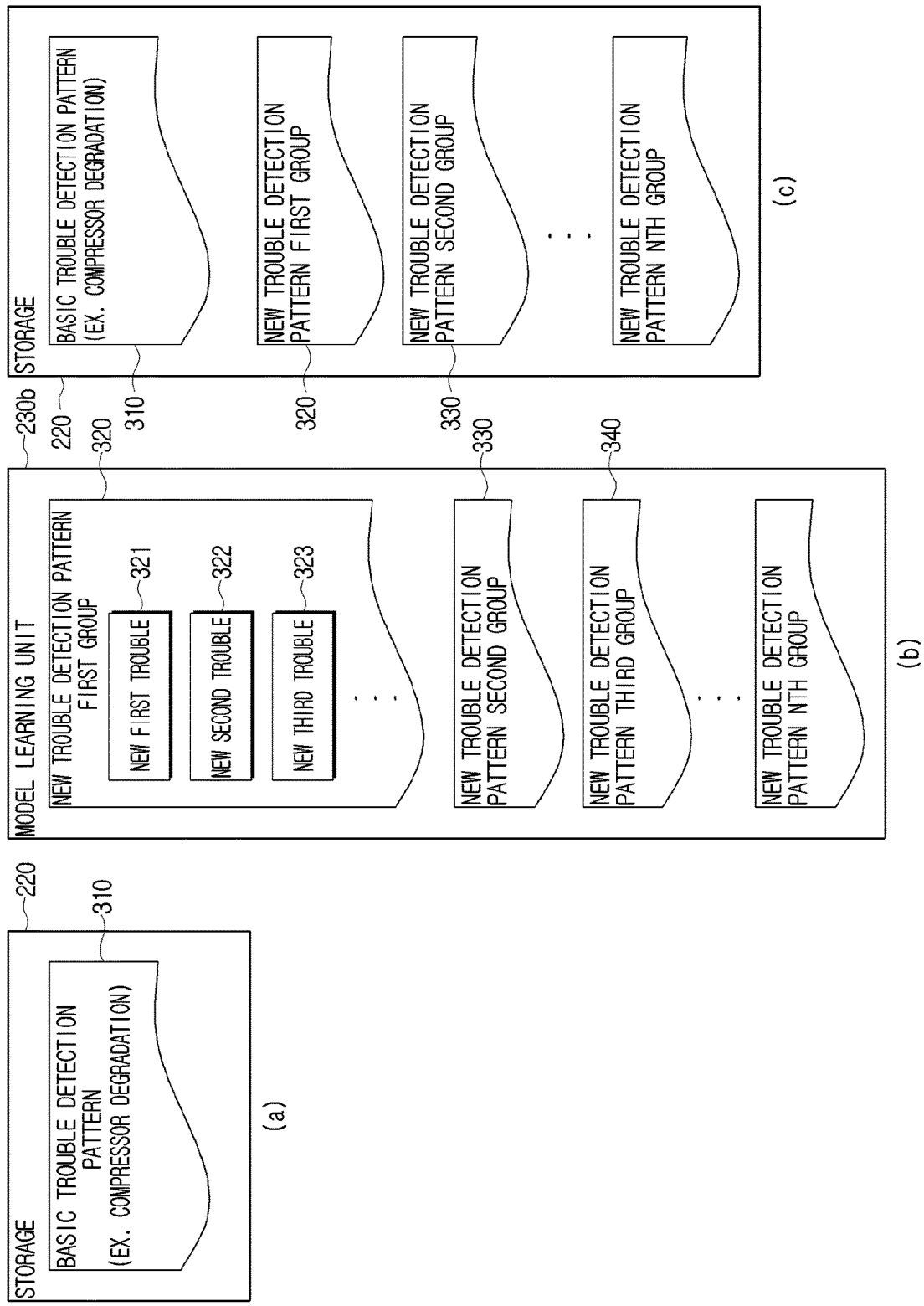

FIG. 4
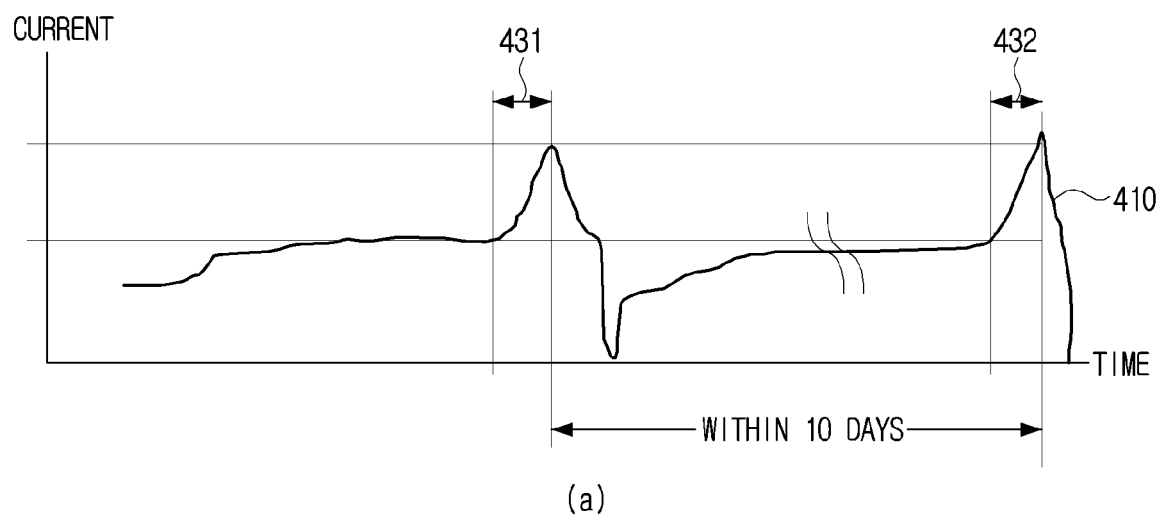
(a)
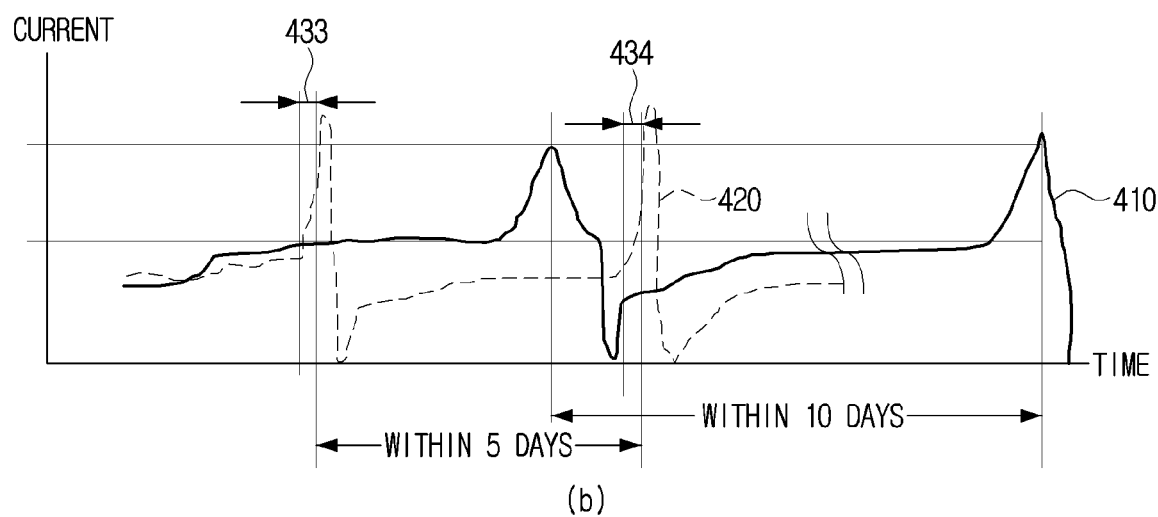
(b)

1000

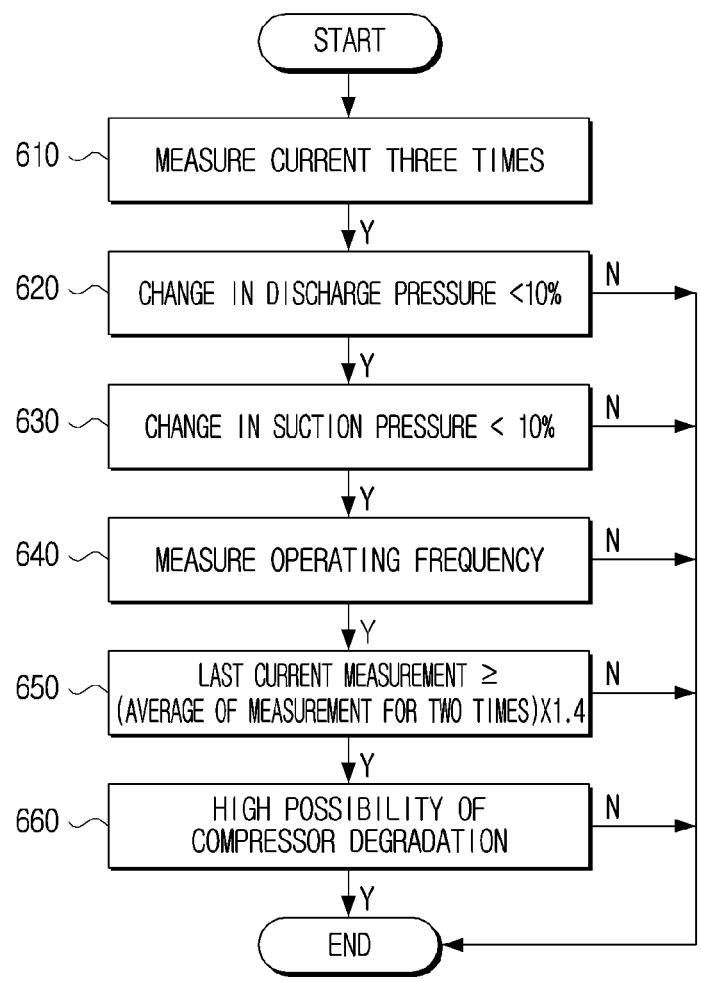

DATA LEARNING SERVER, AND METHOD FOR GENERATING AND USING LEARNING MODEL THEREOF

CROSS-REFERENCE TO RELATED APPLICATIONS

This application is a 371 of International Application No. PCT/KR2018/011700 filed Oct. 2, 2018, which claims priority to Korean Patent Application No. 10-2017-0135070 filed Oct. 18, 2017, the disclosures of which are herein incorporated by reference in their entirety.

BACKGROUND

1. Field

The disclosure relates to a method for generating a learning model and a data learning server using a generated learning model.

2. Description of Related Art

Recently, intelligent services have been used in a variety of application fields to recognize data such as voice, image, video, or text automatically to provide information associated with the data or to provide services associated with the data.

Artificial intelligence (AI) technology used for an intelligent service is the technology that implements a human-level intelligence in which a machine learns, judges, and iteratively improves analysis and decision making, unlike an existing rule-based smart system. As the use of AI systems increases, an accuracy, a recognition rate and understanding or anticipation of a user's taste may be correspondingly increased. As such, existing rule-based smart systems are gradually being replaced by AI systems.

AI technology is composed of machine learning and elementary technologies that utilize machine learning.

Machine learning is an algorithmic technology that is capable of classifying or learning characteristics of input data. Element technology is a technology that simulates functions, such as recognition and judgment of a human brain, using machine learning algorithms, such as deep learning. Machine learning is composed of technical fields such as linguistic understanding, visual understanding, reasoning, prediction, knowledge representation, motion control, or the like.

Various fields implementing AI technology may include the following. Linguistic understanding is a technology for recognizing, applying, and/or processing human language or characters and includes natural language processing, machine translation, dialogue system, question and answer, speech recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

SUMMARY

According to an embodiment of the disclosure, an objective of the disclosure is to diagnose a trouble of a home appliance (for example, an air-conditioner, a refrigerator, a washing machine, a robot cleaner, or the like) using an AI function.

The disclosure provides a method for generating or updating a learning model to diagnose a trouble of a home appliance and using the same.

The tasks to be solved in the disclosure are not limited to the technical challenges set forth above, and other tasks not mentioned can be clearly understood by one of ordinary skill in the art from the following description.

According to an embodiment, a data learning server includes a communicator configured to be communicable with an external device, a learning data acquisition unit configured to acquire production information of a home appliance and operation information related to a trouble of the home appliance using the communicator, a model learning unit configured to generate or update a learning model using the product information and the operation information, and a storage configured to store a learning model trained to estimate a trouble item of the home appliance and a new trouble detection pattern related to the trouble item using the generated or updated learning model.

A data learning server according to an embodiment may include a storage configured to store a learning model trained to estimate a trouble item of a home appliance and a new trouble detection pattern related to the trouble item, a recognition data acquisition unit configured to acquire operation information of the home appliance, a model application unit configured to acquire a trouble item of the home appliance by applying the operation information to the learning model, and a communicator configured to transmit the acquired trouble item to an external device.

An air-conditioner according to an embodiment includes a display, a sensor configured to sense at least one of temperature inside an air-conditioner, temperature, pressure, or humidity outside the air-conditioner, a blower fan configured to discharge cold air to outside, a communicator configured to be communicable with an external device, and a processor configured to comprise a sensing value sensed through the sensor, based on operation information related to a trouble of the air-conditioner being transmitted to the external device, control the communicator to cause a trouble item that is a result of applying the operation information to a learning model to be received from the external device, and control the display to display the received trouble item, and the learning model may be trained using operation information of the air-conditioner.

A user terminal according to an embodiment may include a display, a communicator, an inputter configured to receive a user input, a processor configured to, based on receiving a user input signal requesting to execute a diagnosis function through the inputter, control the communicator to transmit a signal for requesting an operation corresponding to the trouble diagnosis function execution to an air-conditioner, and based on acquiring a trouble item estimated by applying the operation information of the air-conditioner to a learning model according to the signal for requesting an operation from an external device through the communicator, control the display to display the acquired trouble item.

According to an embodiment of the disclosure, possibility of trouble occurrence of a home appliance can be diagnosed by using AI technology and thus, inconvenience of a user can be greatly reduced.

The learning model of the disclosure can be continuously updated using various information of a home appliance. Thus, the more the learning model of the disclosure is used, a trouble diagnosis service with a higher accuracy may be provided to a user.

The learning model of the disclosure may provide a user with a situation in which a home appliance is continuously managed by providing a trouble detection pattern which is continuously updated.

BRIEF DESCRIPTION OF THE DRAWINGS

FIG. 3 is a view to describe estimating a new trouble detection pattern in a trouble diagnosis server according to an embodiment;

FIG. 4 is a view to compare an existing trouble detection pattern and a new trouble detection pattern stored in a data learning server according to an embodiment;

FIG. 6 is a flowchart describing determination on degradation of a compressor according to rise in current using operation information of a compressor included in an air-conditioner by a trouble diagnosis server according to an embodiment;

DETAILED DESCRIPTION

The configurations shown in the embodiments and drawings described herein are merely exemplary, and various modifications may be made to the embodiments and drawings of the disclosure at the time of filing of the present application.

The same reference numbers or numerals presented in each of the figures herein represent parts or components that perform substantially the same function.

The terms used in the disclosure are used to describe embodiments and are not to be construed as being limited by the terms. Singular expressions are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

Furthermore, although the terms "first" "second," and the like as used herein may be used to describe various elements, these elements are not limited by these terms, and the terms are only used to distinguish one element from another. For example, a first element can be termed a second element, and similarly, a second element can be termed a first element without departing from the scope of the disclosure. The term "and/or" includes any of a plurality of associated listed items or a plurality of associated listed items.

It is to be understood that an element (e.g., a first element) is "operatively or communicatively coupled with/to" another element (e.g., a second element) is that any such element may be directly connected to the other element or may be connected via another element (e.g., a third element).

Hereinbelow, the embodiment will be further described with reference to the attached drawings.

Figure 1A:
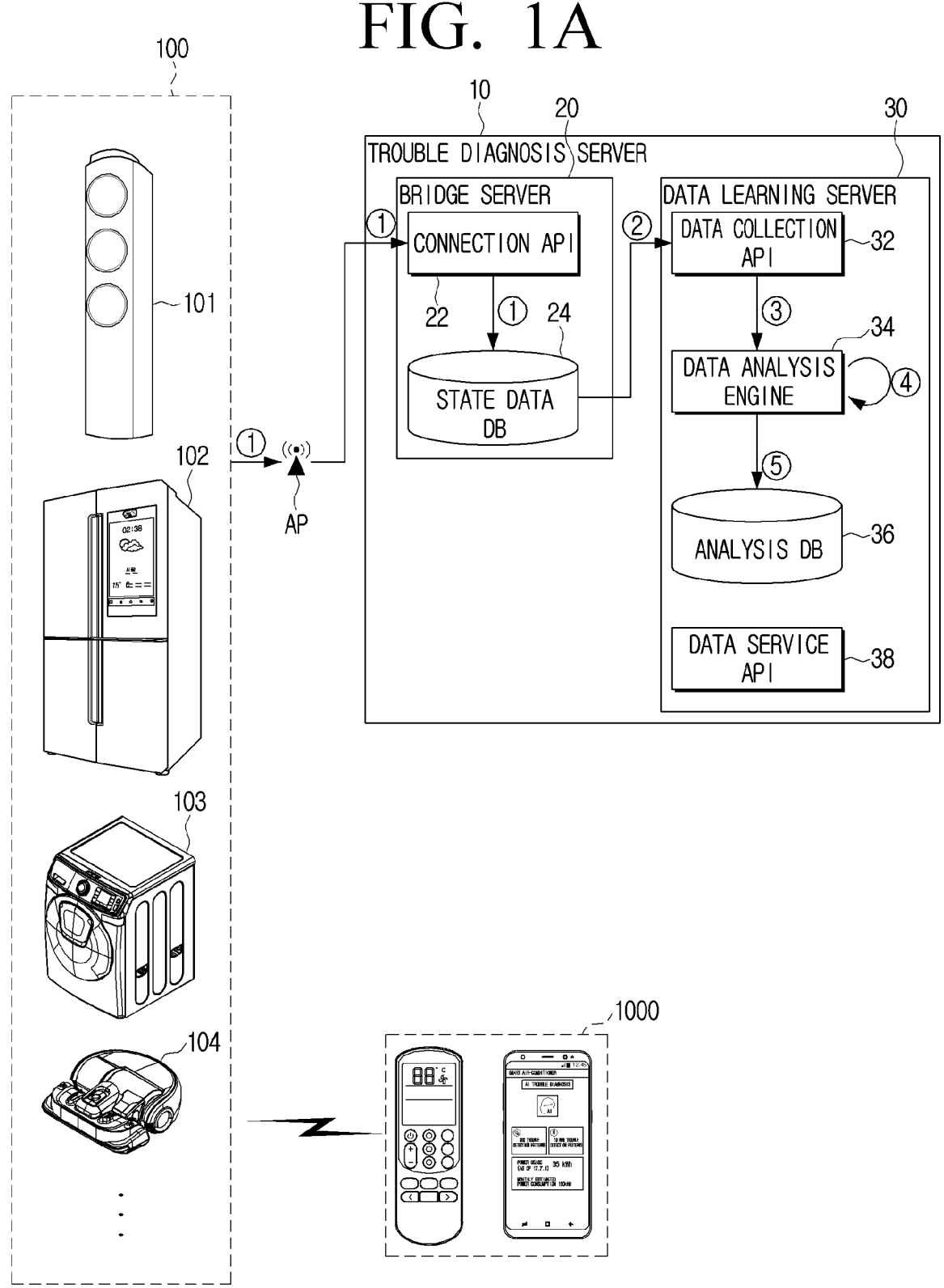
FIGS. 1A and 1B are views illustrating a network system for generating and using a learning model according to an embodiment.
Figure 1B:
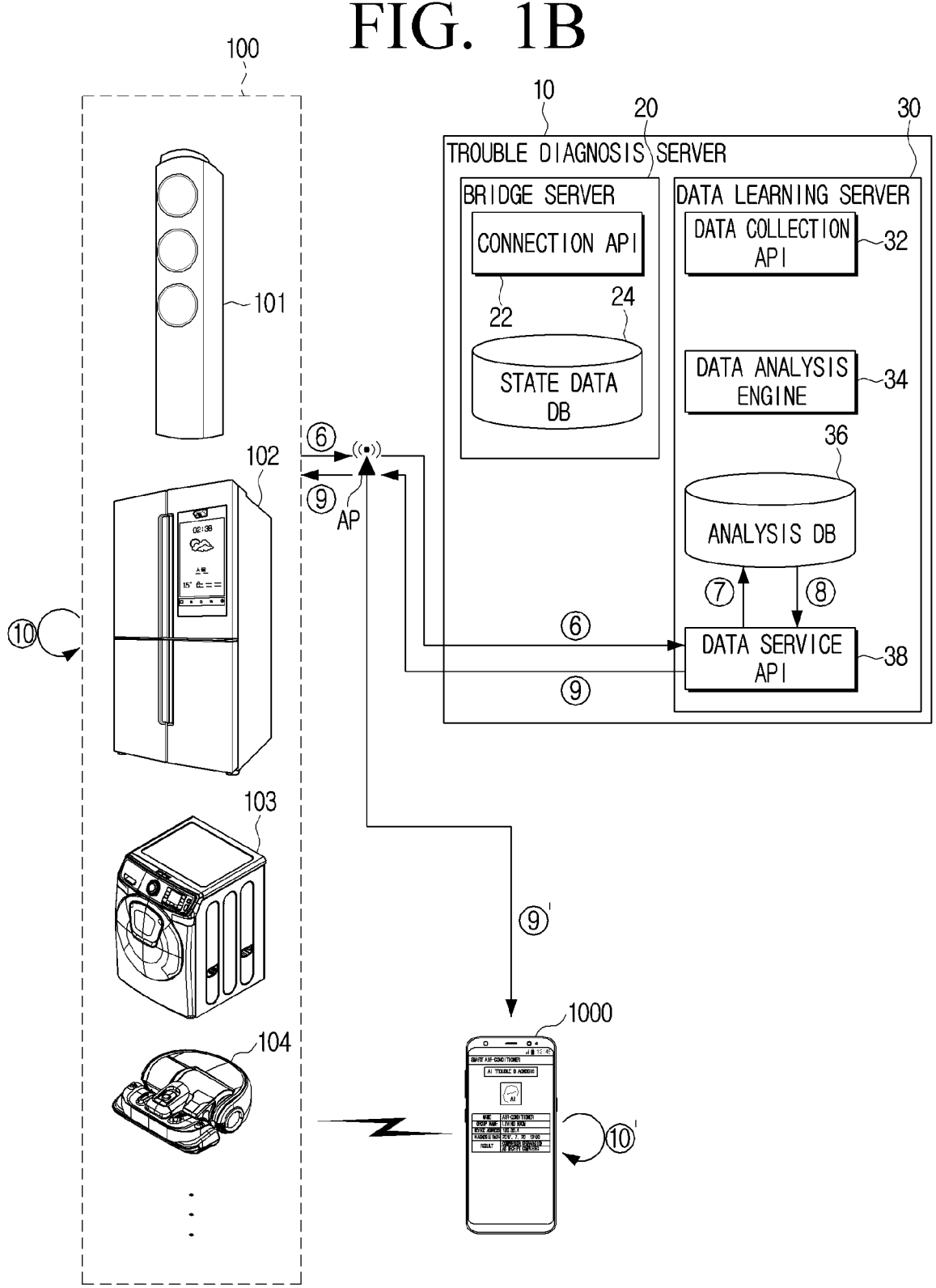

FIGS. 1A and 1B are views illustrating a network system for generating and using a learning model according to an embodiment.

A network system may include a home appliance 100, a user terminal 1000, and a trouble diagnosis server 10.

The home appliance 100 may include, for example, an air-conditioner 101, a refrigerator 102, a washing machine 103, a robot cleaner 104, or the like.

The user terminal 1000 may be a device that remotely controls the home appliance 100. The user terminal 1000 may include, for example, a smart phone, a cellular phone, or a tablet personal computer (PC) equipped with a home appliance control application. According to various embodiments, the user terminal 1000 may include a smart television (TV), a digital camera, a personal digital assistant (PDA), a portable multimedia player (PMP), a notebook computer, a desktop computer, or the like.

The user terminal 1000 may control a home appliance remotely. For example, the user terminal 1000 may transmit a control command to the home appliance 100 by using radio frequency (RF) communication technology such as ultra-high frequency (UHF), very high frequency (VHF), infrared data association (IrDA), wide area network (WAN), local area network (LAN), mobile communication, Bluetooth, Wi-Fi, ZigBee, or the like.

The trouble diagnosis server 10 may be connected with the home appliance 100 via a third device (for example, an access point (AP), a repeater, a router, a gateway, or hub) or directly connected.

According to an embodiment, the trouble diagnosis server 10 may be composed of one server or a plurality of servers according to functions. For example, the trouble diagnosis server 10 may include at least one of a bridge server 20 or a data learning server 30.

According to an embodiment, the bridge server 20 may be, for example, a server for collecting various information (for example, product information, operation information, or the like) from a home appliance. The bridge server 20 may include a connection application programming interface (API) 22 and state data database (DB) 24.

The connection API 22 may include, for example, an application programming interface (API) that serves as an interface between different devices operating according to a heterogeneous protocol. The API may be defined as a set of sub-routines or functions that can be called for any processing of other protocols in any one protocol. That is, the API may provide an environment in which the operation of other protocols may be performed in any one protocol.

The bridge server 20 according to an embodiment may collect product information and operation information of the home appliance 100 using the connection API 22. The bridge server 20 may store the product information and operation information of the collected home appliance 100 in the DB 24.

According to an embodiment, the data learning server 30 may generate a learning model and obtain a learning model application result by using the learned generation model. The data learning server 30 may include, for example, a data collection API 32, a data analysis engine 34, an analysis DB 36, and a data service API 38.

Generating a learning model by the data learning server 30 will be described referring to FIG. 1A.

In operation ①, the home appliance 100 may transmit operation information of the home appliance 100 to the trouble diagnosis server 10 via a third device (e.g., an access point (AP), a repeater, a router, a gateway, or a hub). According to various embodiments, the home appliance 100 may transmit product information of the home appliance 100 to the trouble diagnosis server 10. The bridge server 20 of the trouble diagnosis server 10 may collect product information and operation information of the home appliance 100 transmitted from home appliance 100 using the connection API 22 and store the collected product information and operation information of the home appliance 100 in the status data DB 24.

According to an embodiment, the product information of the home appliance 100 may be at least one of a type of the home appliance (e.g., air-conditioner, cleaner, refrigerator, robot cleaner, or the like) or a product identifier (e.g., manufacturing number, product name, manufacturing date, or the like).

According to various embodiments, the product information of the home appliance 100 may include position information of the home appliance 100.

The operation information of the home appliance 100 may be, for example, at least one of an operational history (e.g., a set operating mode, a periodically measured driving mode frequency), performance information (e.g., periodically measured operating efficiency), a current measurement, a frequency measurement, a temperature measurement (e.g., temperature within the home appliance, temperature outside the home appliance, etc.), a pressure measurement, a vibration measurement, or a trouble history (e.g., error code generation, operation hold, or the like).

According to various embodiments, the operation information of the home appliance 100 may include at least one of time for setting various driving modes or a period for maintaining driving mode.

In operation ②, the data learning server 30 may obtain the product information and operation information of the home appliance 100 stored in the state data DB 24 of the bridge server 20 using the data collection API 32.

In operation ③, a data analysis engine 34 of the data learning server 30 may obtain the product information and operation information of the home appliance 100 obtained through the data collection API 32.

In operation ④, the data analysis engine 34 of the data learning server 30 may generate or update a learning model for estimating a trouble item and a new trouble detection pattern associated with the trouble item of the home appliance 100 using the acquired operation information of the home appliance 100 as learning data. According to various embodiments, the data analysis engine 34 may use the obtained product information of the home appliance 100 as learning data.

A trouble item may mean a trouble of a component forming a home appliance, such as, for example, a compressor trouble, a fan trouble, or the like. The trouble detection pattern may mean, for example, a change in the current value measured in a compressor, a fan, etc., a change in a pressure value, a change in frequency, or the like. However, a trouble item and a trouble detection pattern are not limited thereto.

According to various embodiments, an interval in which the data learning server 30 generates or updates the learning model using the learning data may proceed on a time basis, daily basis, or monthly basis, or in the event of a particular event occurrence. However, the generation and update intervals of the learning model are not limited thereto.

In operation ⑤, the data learning server 30 may store the generated learning model in the analysis DB 36. In this case, the learning model may be configured to estimate a new trouble detection pattern related to a trouble item of the home appliance 100, not a general learning model.

According to various embodiments, the trouble item may include an existing trouble item stored in the analysis DB 36 and a new trouble item not stored in the analysis DB 36. That is, the data learning server 30 may transmit a new trouble item corresponding to the estimated new trouble detection pattern to the data service API 38.

Referring to FIG. 1B, using a learning model by the data learning server 30 will be described.

In operation ⑥, the home appliance 100 may transmit operation information of the home appliance 100 to the trouble diagnosis server 10 via a third device (e.g., an access point (AP)). The data learning server 30 of the trouble diagnosis server 10 can obtain the operation information of the home appliance using the data service API 38.

In operation ⑦, the data learning server 30 may enter the obtained operation information of the home appliance 100 into a learned learning model to estimate a trouble item of the home appliance 100 stored in the analysis DB 36 and a new trouble detection pattern associated with the trouble item.

In operation ⑧, the data learning server 30 may estimate a trouble item related to the operation information of the home appliance 100 as a result of the application of the learning model. Estimating the trouble item may be, for example, estimating a probability of trouble (or a probability of trouble occurrence) using the operation information. The analysis DB 36 of the data learning server 30 may transmit the estimated trouble item to the data service API 38.

According to various embodiments, the analysis DB 36 of the data learning server 30 may transmit, to the data service API 38, information related to the newly estimated trouble detection pattern (e.g., the number of new trouble detection patterns, a trouble item associated with a new trouble detection pattern, an importance of a new trouble detection pattern, etc.) regardless of the operation information obtained from the home appliance 100. For example, the analysis DB 36 may transmit information associated with the newly added trouble detection pattern to the data service API 38 in accordance with a period in which the data learning server 30 updates the learning model using product information and operation information.

In operation ⑨, the data learning server 30 may transmit the estimated trouble item to the home appliance 100 via a third device (e.g., an access point (AP)). Further, the data learning server 30 can transmit information related to the newly estimated trouble detection pattern to the home appliance 100 through the third device. According to various embodiments, in operation ⑨, the data learning server 30 can transmit the determined trouble item to the user terminal 1000 via the third device. The data learning server 30 can transmit information related to the newly estimated trouble detection pattern to the user terminal 1000 through the third device.

In operation ⑩, the home appliance 100 receiving the trouble item related to the new trouble detection pattern can display the received trouble item on a display or the like. Further, the home appliance 100 receiving the information related to the newly estimated trouble detection pattern can display information related to the received trouble detection pattern (e.g., the number of newly registered trouble detection patterns, etc.) on a display or the like.

According to various embodiments, in operation ⑩ the user terminal 1000 receiving the trouble item related to the new trouble detection pattern can display the received trouble item on a display or the like. The user terminal 1000 receiving the information related to the newly estimated trouble detection pattern can display information related to the received trouble detection pattern (e.g., the number of newly registered trouble detection patterns, etc.) on a display or the like.

Figure 2A:
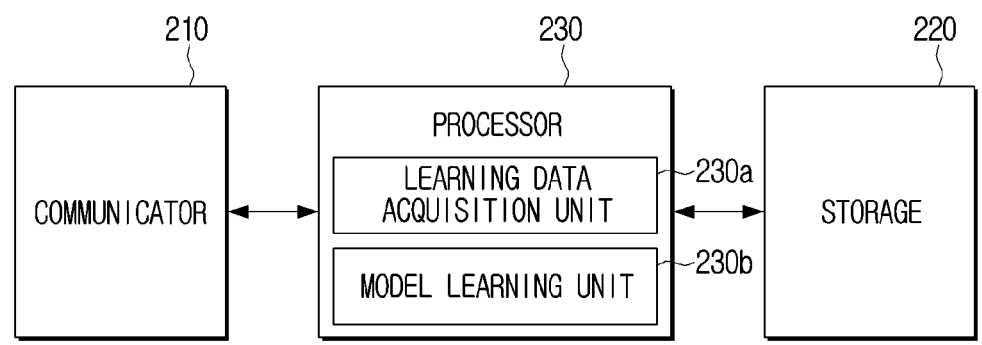
FIGS. 2A and 2B are views illustrating a configuration of a data learning server 30 according to an embodiment.
Figure 2B:
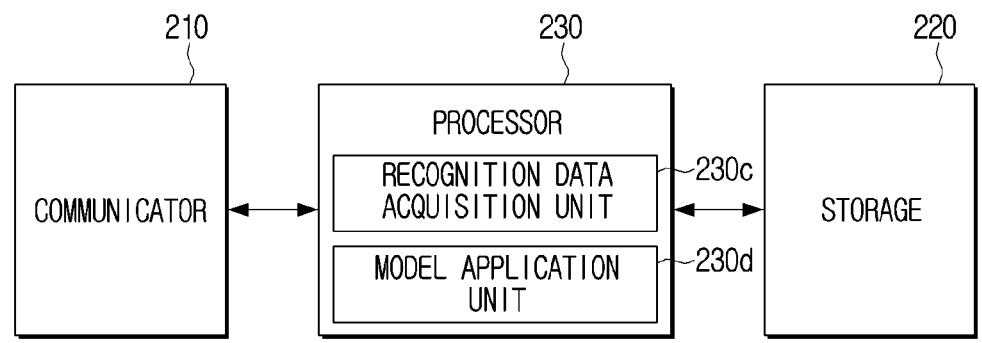

FIGS. 2A and 2B illustrate a configuration of the data learning server 30 according to an embodiment.

FIG. 2A is a functional block diagram in which the data learning server 30 generates or updates a learning model. FIG. 2B is a functional block diagram of using a learning model generated or updated by the data learning server 30.

According to various embodiments, the learning model included in the data learning server 30 may be constructed in consideration of an application field of a learning server, a purpose of learning, computer performance of the device, or the like. The learning model may be a model based on, for example, a neural network. For example, learning models such as deep neural network (DNN), recurrent neural network (RNN), and bidirectional recurrent deep neural network (BRDNN) may be used but are not limited thereto.

Referring to FIGS. 2A and 2B, the data learning server 30 may include a communicator 210, a storage 220, and a processor 230.

The communicator 210 may communicate with an external device.

The external device may include at least one of an external server (for example, the bridge server 20, or the like) or the home appliance 100.

The communicator 210 may communicate with an external device by wire or wirelessly. Wireless communication may include, for example, cellular communication, near-field wireless communication, or global navigation satellite system (GNSS) communication. Cellular communication may include, for example, long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). Near-field wireless communication may include, for example, wireless fidelity (WiFi) WiFi Direct, light fidelity (LiFi), Bluetooth, Bluetooth low energy (BLE), Zigbee, near field communication (NFC), magnetic secure transmission, radio frequency (RF), or body area network (BAN).

The data learning server 30 may include the storage 220. The storage 220 may store a learning model generated by the data learning server 30.

The storage 220 may include a volatile memory or a non-volatile memory. The volatile memory may include, for example, random access memory (RAM) (for example, DRAM, SRAM, or SDRAM). The non-volatile memory may include, for example, one time programmable read-only memory (ROM) (OTPROM), programmable read-only memory (PROM), erasable programmable read-only memory (EPROM), electrically erasable programmable read-only memory (EEPROM), mask ROM, flash ROM, flash memory, hard drive, or sold state drive (SSD).

The processor 230 may include one or more of a central processing device, an application processor, a graphic processing unit (GPU), a camera image signal processor, or a communication processor (CP).

According to an embodiment, the processor 230 may be implemented as a system on chip (SoC) or a system in package (SiP). The processor 230 may, for example, drive an operating system or application program to control at least one other component (e.g., hardware or software components) of data learning server 30 coupled to processor 230, and may perform various data processing and calculations.

The processor 230 may load a command or data received from other components (for example: the communicator 210) to a volatile memory and process the same, and store result data in the non-volatile memory.

The processor 230 in FIG. 2A is a functional block diagram for generating a learning model Referring to FIG. 2A, the processor 230 may include a learning data acquisition unit 230a and a model learning unit 230b.

The learning data acquisition unit 230a may acquire at least one of product information and operation information of the home appliance 100 through the communicator 210. For example, the learning data acquisition unit 230a may obtain the product information and the operation information of the home appliance 100 from the bridge server 20 connected to the home appliance 100. Alternatively, the learning data acquisition unit 230a may obtain product information and operation information from the home appliance 100 or a third device in communication with the home appliance 100.

The model learning unit 230b may generate or update the learning model using the acquired operation information of the home appliance 100. In addition, the model learning unit 230b can generate or update the learning model using the obtained product information of the home appliance 100. The storage 220 may store the learned learning model to estimate the new trouble detection pattern of the home appliance 100 as a result of the creation or updating of the learning model.

FIG. 2B is a functional block diagram in which the processor 230 uses a learning model.

Referring to FIG. 2B, the processor 230 may include a recognition data acquisition unit 230c and a model application unit 230d. In this example, the storage 220 may estimate a new trouble detection pattern of the home appliance 100 and store a learning model that is learned to provide a trouble item related to the estimated new trouble detection pattern.

Referring to FIG. 2B, the recognition data acquisition unit 230c may acquire operation information of the home appliance 100.

The model application unit 230d may apply the acquired operation information to the learning model of the storage 220 and acquire the trouble item of the home appliance 100.

The communicator 210 may transmit the acquired trouble item of the home appliance 100 to an external device. The external device may be, for example, the home appliance 100 or the third device in communication with the home appliance 100, or the like.

According to various embodiments, the processor 230 may control the communicator 210 to transmit the information related to the trouble detection pattern newly estimated by the learning model of the storage 220 to an external device.

FIG. 3 is a view to describe estimating a new trouble detection pattern in a trouble diagnosis server according to an embodiment.

Referring to FIG. 3A, the storage 220 may store a basic trouble detection pattern 310. The basic trouble detection pattern may be, for example, a result generated by a manufacturer through repeated experiment and data collection.

Referring to FIG. 3B, the model learning unit 230*b* can generate or update the learning model using the operation information of the home appliance 100 obtained through the communicator (e.g., the communicator 210 of FIG. 2A). The model learning unit 230*b* may generate or update the learning model using the obtained product information of the home appliance 100.

For example, the model learning unit 230*b* may estimate a new trouble detection pattern using the operation information of the home appliance 100. The model learning unit 230*b* may estimate a new trouble detection pattern by further using the acquired product information of the home appliance 100.

According to an embodiment, the model learning unit 230*b* may detect a trouble history (for example, a history of generating an error related to a trouble, a history in which driving has been stopped due to a trouble, a history in which an driving performance is degraded to less than or equal to a preset level (for example: 60% or less compared to an average driving performance, etc.)) among the acquired operation information, and may identify the operation information for a predetermined period at the time when the trouble history is detected.

For example, the model learning unit 230*b* may detect a record that current is maintained at 10 A or more for 10 minutes or more at the compressor by calculating back for ten hours on the basis of the time when the trouble history is detected. The model learning unit 230*b* may store the detected record as a new first trouble 321.

The model learning unit 230*b* may accumulate a record with a new second trouble 322 and a new third trouble 323 if a current change and a trouble history similar to that of the current change are found. If the accumulated record exceeds a predetermined number of times (e.g., detection at 500 or more home appliances 100), the model learning unit 230*b* may estimate the change in current as a new trouble pattern and generate a first group 320 of trouble patterns.

According to various embodiments, the model learning unit 230*b* may update a prestored basic trouble detection pattern. The basic trouble detection pattern 310 may be changed such that, for example, current of the compressor is changed to 10 A or more for three times or more within one hour.

The model learning unit 230*b* according to various embodiments may detect a record, for example, a current value which is 10 A or more for three times or more is measured within one and half hours in the compressor by calculating back for five hours from the time when the trouble history is detected.

The model learning unit 230*b* may estimate that the detected record is similar to the format of the pre-stored basic trouble detection pattern 310 and accumulate and store the detected pattern in the basic trouble detection pattern 310. If the record accumulated in a pattern similar to the basic trouble detection pattern exceeds a predetermined number of times (e.g., detection at 100 or more home appliances 100), the model learning unit 230*b* may update the basic trouble detection pattern 310 by reflecting the detected pattern to the basic trouble detection pattern 310.

According to various embodiments, the model learning unit 230*b* may estimate and generate a new trouble detection pattern using a plurality of items included in the operation information.

According to various embodiments, the model learning unit 230*b* can detect, for example, a record that current is maintained at 10A or more for three times or more within one hour in the compressor, by calculating back for ten hours from the time when the trouble history is detected, at 500 or more home appliances 100. The model learning unit (e.g., 230*b*) may detect a record that the current is maintained at 10A or more for three times or more within one hour in the processor without a trouble at 500 or more home appliances.

The model learning unit 230*b* may further detect a record of other items among the operation information of the home appliance 100. For example, if the current is maintained at 10A or more for three times or more within one hour in the compressor, the model learning unit 230*b* may detect a record that the temperature of the compressor rises for ten or more degrees from an average driving temperature at the same period, along with the trouble history.

The model learning unit 230*b* may estimate and generate a case where the temperature of the compressor rises for ten degrees or more than the average driving temperature and the current changes to 10A or more for three times or more within one hour, at the same time, as a new trouble pattern.

The model learning unit 230*b* according to an embodiment may repeat the above operation and generate or update a second group 330 of a new trouble pattern, a third group 340 of a new trouble pattern, or the like.

Referring to FIG. 3C, the storage 220 may acquire and store the data that the model learning unit 230*b* estimates as the new trouble detection pattern and generates.

According to an embodiment, the data learning server 30 can predict the trouble of the home appliance 100 by using the updated or generated learning model as described above. Accordingly, the manufacturer who operates the trouble diagnosis server 10 including the data learning server 30 may reduce the inconvenience of a user on the use of the product by taking an action, such as preparing the component in advance in preparation for any trouble.

FIGS. 4A and 4B are views to compare an existing trouble detection pattern stored in the data learning server and a new trouble detection pattern according to an embodiment.

A horizontal axis of the graph of FIGS. 4A and 4B may represent time, and a vertical axis of the graph may represent a current. A first curve 410 and a second curve 420 displayed on the graph may represent a measurement of current over time.

The first curve 410 shown in FIG. 4A may be a trouble detection pattern in which the data learning server 30 is already stored. For example, the pre-stored trouble pattern may be the case when the current measured at the compressor rises to a predetermined slope (e.g., a slope having a value of two) to exceed 10 A within ten days. In this case, the data learning server 30 may assume that the compressor is likely to be degraded.

According to various embodiments, the predetermined slope may have a variation about 5%. The data learning server 30 may estimate that it is highly likely that the trouble (example: degradation of the compressor) may occur in the home appliance 100 based on a record that the current rises to a slope having a value of 2 in the first section 431, reaching 10 A, and the current rises with a slope having a value of 2.1 in the second section 432, reaching 10 A.

The second curve 420 illustrated in FIG. 4B may be a trouble detection pattern generated by estimating as a new trouble detection pattern by the data learning server 30. For example, the data learning server 30 can estimate and generate the second curve 420 as the new trouble detection pattern after acquiring, from 100 or more home appliances 100, a current change over time of a pattern similar to the second curve 420 and a trouble history that a trouble has occurred within five hours within five hours from the current change.

According to an embodiment, in the new detection pattern, the current measured by the compressor may rise to a slope value of 3 for two times or more within five days, exceeding 10 A.

According to various embodiments, the predetermined slope may have a range of 5%. The data learning server 30 may estimate that the home appliance 100 may highly likely to have a trouble based on a record that current rises with a slope having a value of 3 in the third section 433 and exceeds 10 A, and the current rises with a slope having a value of 3.15 in the fourth section 434 and exceeds 10 A.

According to various embodiments, the first curve 410 illustrated in FIG. 4A is a pre-stored trouble detection pattern, and may be a case in which the current measured by the compressor rises sharply by 10% or more compared to the average value by two times or more within ten days. In this example, the data learning server 30 may estimate that the compressor is likely to be degraded.

For example, the data learning server 30 may estimate that a trouble highly likely occurs (for example: degradation of compressor) in the home appliance 100 based on a record that the current rises 10% or more as compared to the average value in the first section 431 and the current rises 10% or more as compared to the average value in the second section 432 as well.

According to various embodiments, the second curve 420 shown in FIG. 4B may be a trouble detection pattern estimated by the data learning server 30 as a new trouble detection pattern. For example, the data learning server 30 may estimate and generate the second curve 420 as the new trouble detection pattern after acquiring a current change over time of a pattern similar to the second curve 420 and a trouble history within three hours from the current change from 1000 or more home appliances 100.

According to various embodiments, the second curve 420 shown in FIG. 4B may be a trouble detection pattern generated by the data learning server 30 as the new trouble detection pattern. The new trouble detection pattern may be a case where the current measured by the compressor rises sharply by 12% or more compared to the average value for two times or more within five days.

For example, the data learning server 30 may estimate that a trouble (example: degradation of compressor) highly likely occurs in the home appliance 100 based on a record that the current rises for 12% or more as compared to the average value in the third section 433 and the current rises for 12% or more in the fourth section 434 by 12% or more as compared to the average value.

The data learning server 30 according to an embodiment may estimate possibility of trouble before trouble occurs in a key component and transmit a signal requesting to proceed a pre-order of the component to a manufacturer of the home appliance 100.

Thus, the manufacturer may save time for replacement of the component for repair and reduce serial trouble occurrence in a high price component due to a trouble in a low price component. The manufacturer may notify a repairing engineer of the trouble of information on the component with trouble occurrence in advance, and the repairing engineer may reduce time for trouble repairing.

Figure 5A:
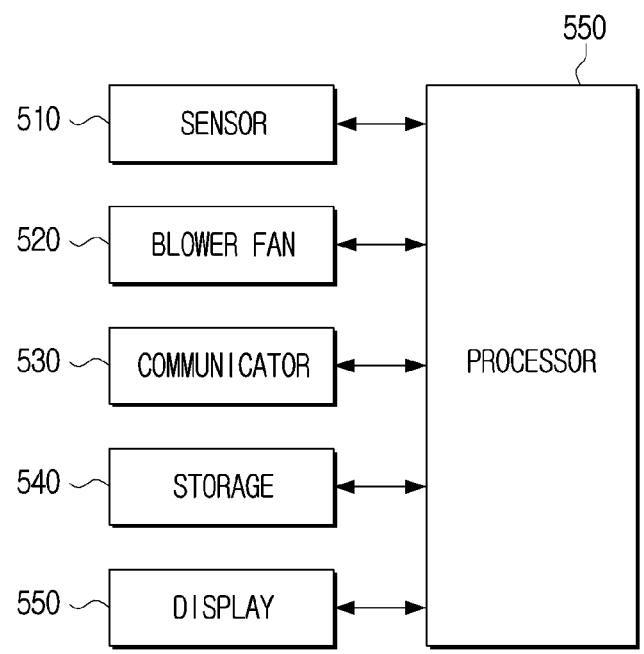
FIG. 5A is a block diagram illustrating a configuration of an air-conditioner which is one of a home appliance according to an embodiment.

FIG. 5A is a block diagram illustrating a configuration of an air-conditioner which is one of a home appliance according to an embodiment.

Referring to FIG. 5A, the air-conditioner 101 may include a sensor 510, a blower fan 520, a communicator 530, a storage 540, a display 560, and a processor 550. As various embodiments, the air-conditioner 101 may omit at least one of the aforementioned elements or additionally include other elements.

The sensor 510 may include, for example, a temperature sensor, a pressure sensor, a vibration sensor, a humidity sensor, an illumination sensor, or the like. According to an embodiment, the sensor 510 may sense temperature inside the air-conditioner 101 and indoor temperature around the air-conditioner 101.

The blower fan 520 may discharge cold air to the outside through an opening/closing part (not shown). Alternatively, in a still-air mode, the blower fan 520 may discharge cold air to the outside by a predetermined speed or less through a plurality of micro holes (not shown). The predetermined speed may be 0.25 m/s or less, and preferentially 0.15 m/s or less.

The communicator 530 may communicate with an external device. At this time, the external device may include at least one of a trouble diagnosis server 10, the data learning server 30, and a user terminal 1000. Communication of the communicator 530 with the external device may include communicating with an external device via a third device or the like. For example, the communicator 530 may receive a remote control signal for controlling the air-conditioner 101 from the user terminal 1000.

The communicator 530 may communicate with an external device through wired communication or wireless communication. For example, the communicator 530 may perform communication according to standards such as cellular communication, near-field communication, and communication with the control terminal device through the Internet, universal serial bus (USB) communication, Wi-Fi, Bluetooth, Zigbee, infrared (IR), radio frequency (RF) such as ultra-high frequency (UHF), and very high frequency (VHF), ultra-wideband (UWB), or the like.

The storage 540 stores various software and programs for performing the functions of the air-conditioner 101. Specifically, the storage 540 may store a temperature control algorithm according to a plurality of driving modes. Here, the temperature control algorithm may include a change in a set temperature according to a predetermined period of each operation mode, an intensity of a wind velocity, a direction of a wind speed, or the like. Further, according to the disclosure, the storage 540 may store the trained learning model based on the operation information of the air-conditioner 101.

The processor 550 may read out a program stored in the storage 540. The processor 550 may read out programs including a series of readable instructions and perform air conditioning according to set temperature, to perform a function of the air-conditioner 101.

The processor 550 may sense the pressure and/or temperature of the refrigerant in the indoor heat exchanger to detect whether normal air conditioning is being performed. For example, the processor 550 may sense whether there is a damage or frost in the indoor heat exchanger tubing and whether water in which vapor in the air is condensed is properly removed.

The processor 550 may control the speed of the blower fan 520. Specifically, the processor 550 may control the speed at which the blower fan 520 rotates according to the ambient temperature and the set temperature measured by the sensor 510. Specifically, the processor 550 may control the speed at which the blower fan 520 rotates according to the difference between the ambient temperature and the set temperature. For example, if the difference between the ambient temperature and the set temperature is large, the rotational speed of the blower fan 520 may be increased to reach the set temperature, and if the difference between the indoor temperature and the set temperature is small or the indoor temperature reaches the set temperature, the rotational speed of the blower fan 520 can be slowed down so that the compressor of the outdoor unit is not turned off as the indoor temperature falls too much. For example, the processor 550 may control the speed of rotation of the blower fan 520 between 500 revolutions per minute (RPM) and 900 RPM.

The processor 550 may control the communicator 530 to transmit product information (for example, manufacturing number, name, and manufacturing date, or the like, of the air-conditioner 101) and operation information (for example, operation history, performance information, current measurement, frequency measurement, temperature measurement, pressure measurement, vibration measurement, trouble history, or the like) of the air-conditioner 101 to an external device.

The processor 550 may control the communicator 530 to receive new trouble detection pattern information and the trouble item received from an external device and control to display the obtained new trouble detection pattern and the trouble item on the display 560, or the like, through the communicator 530.

The display 560 may display various information related to the air-conditioner. For example, the display 560 may display the current ambient temperature, temperature set by the user, current wind velocity, operation mode, or the like.

The display 560 according to an embodiment may display information related to the new trouble detection pattern received from an external device and a trouble item.

According to various embodiments, there may be a network system including a data learning server (example: the data learning server 30 of FIG. 1A) for generating a learning model using the air-conditioner 101 and the learning data obtained from the air-conditioner 101.

The air-conditioner 101 of the network system may include the sensor 510 for sensing the temperature inside or around the air-conditioner 101, the blower fan 520 for discharging cold air to the outside, and the communicator 530 communicable with an external device. The air-conditioner 101 may include the processor 550 for controlling the communicator 530 to transmit the temperature set in the air-conditioner 101 and the ambient temperature sensed through the sensor 510 to the external device.

The external device may include the trouble diagnosis server 10, the data learning server (example: the data learning server 30 of FIG. 1A), or a third device communicated to at least one of the trouble diagnosis server 10 or the data learning server (example: the data learning server 30 of FIG. 1A).

The data learning server (e.g., data learning server 30 of FIG. 1A) of the network system may include the learning data acquisition unit (e.g., a learning data acquisition unit 203*a* of FIG. 2A) for acquiring the product information and operation information transmitted from the air-conditioner 101, the model learning unit (e.g., the model learning unit 203*b* of FIG. 2A) for generating a learning model using the operation information, and a storage (e.g., the storage 202 of FIG. 2A) that stores the trouble item and the trained learning model to estimate a new trouble detection pattern associated with the trouble item as a result of the generation of the learning model.

According to various embodiments, there may be a network system including the air-conditioner 101 and the data learning server (e.g., data learning server 30 of FIG. 1A) for providing a trouble item using recognition data acquired from the air-conditioner 101.

The air-conditioner 101 of the network system may include the sensor 510 for sensing ambient temperature, the blower fan 520 for discharging cold air to the outside, the communicator 530 communicable with an external device, and the processor 550 for controlling the communicator 530 to transmit the operation information of the air-conditioner 101 to an external device.

The external device may include the trouble diagnosis server 10, the data learning server (example: the data learning server 30 of FIG. 1A), or a third device communicated to at least one of the trouble diagnosis server 10 or the data learning server (example: the data learning server 30 of FIG. 1A).

The data learning server (e.g., data learning server 30 of FIG. 1A) may estimates a new trouble pattern of the air-conditioner 101 and include the storage (e.g., storage 202 of FIG. 2B) for storing a trained learning model to provide a trouble item related to the estimated trouble pattern, the recognition data acquisition unit (e.g., the recognition data acquisition unit 203*c* of FIG. 2B), which obtains the operation information of the air-conditioner 101, the model application unit (e.g., the model application unit 203*d* of FIG. 2B) that obtains the trouble item of the air-conditioner 101 by inputting the operation information into the learning model, and the communicator 201 (e.g., the communicator 201 of FIG. 2B) for transmitting the obtained trouble item to the external device. The external device may include the air-conditioner 101 or a third device in communication with the air-conditioner 101. The external device may include the user terminal 1000 or a third device in communication with the user terminal 1000 for transmitting recommended temperature.

Figure 5B:
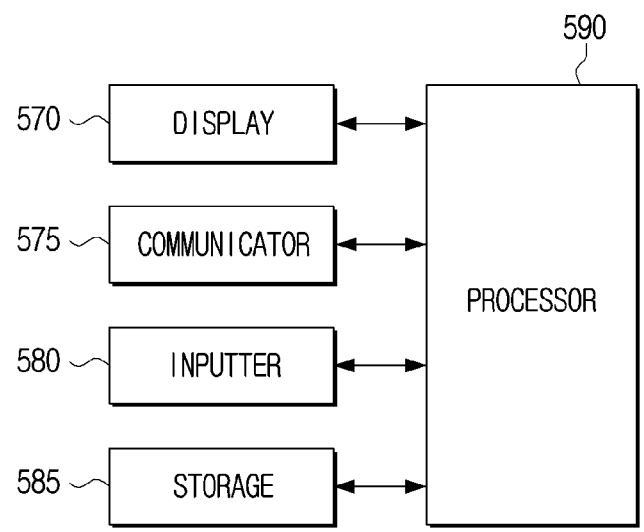
FIG. 5B is a block diagram illustrating a configuration of a user terminal 1000 according to an embodiment.

FIG. 5B is a block diagram illustrating a configuration of a user terminal 1000 according to an embodiment.

Referring to FIG. 5B, the user terminal 1000 may include a display 570, a communicator 575, an inputter 580, a storage 585, and a processor 590.

The display 570 may provide information of the user terminal 1000 to a user visually. For example, the display 570 may display user interface related to an AI operation by the control of the processor 590.

The communicator 575 may support establishment of a wired or wireless communication channel between the user terminal 1000 and an external device, and communication performance through the established communication channel. The external device may include, for example, at least one of a trouble diagnosis server (e.g., the trouble diagnosis server 10 of FIG. 1A), the data learning server (e.g., the data learning server 30 of FIG. 1A), and a third device in communication with the trouble diagnosis server (e.g., the trouble diagnosis server 10 of FIG. 1A) and the data learning server (e.g., the data learning server 30 of FIG. 1A).

The communicator 575 may communicate with an external device via near-field communication network (e.g., Bluetooth, WiFI direct, infrared data association (IrDA), or the like) or remote distance communication network (e.g., cellular network, Internet, or computer network (e.g., LAN or WAN)) using a wireless communication module (e.g., a cellular communication module, a near-field wireless communication module, or a global navigation satellite system (GNSS) communication module), wired communication module (e.g., a local area network (LAN) communication module, or powerline communications module) The various types of communication modules described above may be implemented as a single chip or a separate chip.

The inputter 580 may receive an instruction or data to be used for a component (for example: processor 590) of the user terminal 1000 from the outside (e.g., user). The inputter 580 may include, for example, a button, a microphone, a touch panel, or the like. The inputter 580 may transmit a user input signal generated in accordance with a user input to control the user terminal 1000 to the processor 590.

The storage 585 may store various data used by at least one element (e.g., processor 590), for example, software (e.g., program), input data or output data regarding a command related thereto. The storage 585 may include a volatile memory or a non-volatile memory.

The program is software (for example, operating system) stored in the storage 585 and may include middle ware or application.

The processor 590 may drive, for example, software (e.g., program) stored in the storage 585 to control at least one other element (e.g., hardware or software element) of the user terminal 1000 connected to the processor 590 and perform various data processing and calculations. The processor 590 may load and process the instructions or data received from other elements (e.g., communicator 575) to the volatile memory and store resultant data in the non-volatile memory.

According to one embodiment, the processor 590 may include a main processor (e.g., a central processing unit or application processor), and an auxiliary processor (e.g., a graphics processing unit, an image signal processor, a sensor hub processor, or a communication processor) that is operated independently, additionally or alternatively, using less power than the main processor, or specialized for a specified function. Here, the auxiliary processor may be operated separately or embedded in the main processor.

According to various embodiments, when a user input signal according to a user input for selecting a user interface related to an artificial intelligence operation included in a screen provided by the display 570 is received through the inputter 580, the processor 590 may control the communicator 575 to transmit an AI operation request signal corresponding to a user interface related to the AI operation to an air-conditioner (e.g., the air-conditioner 101 of FIG. 1A). When a trouble item of the air-conditioner (e.g., the air-conditioner 101 of FIG. 1A) is acquired through the communicator 575 according to the AI operation request signal, the processor 590 may control the display 570 to display the obtained trouble item. At this time, the trouble item may be obtained as a result of applying the operation information of the air-conditioner (for example, the air-conditioner 101 of FIG. 1A) to the learning model by the air-conditioner (for example, the air-conditioner 101 of FIG. 1A).

According to various embodiments, there may be a network system including the air-conditioner (e.g., the air-conditioner 101 of FIG. 1A) and the user terminal 1000 for controlling the air-conditioner (e.g., the air-conditioner 101 of FIG. 1A).

When the user input signal according to the user input selecting the user interface related to the AI operation included in the screen provided by the display 570 of the user terminal 1000 is received through the inputter 580, the processor 590 may control the communicator 575 to transmit the AI operation request signal corresponding to the user interface related to the AI operation to the air-conditioner (e.g., the air-conditioner 101 of FIG. 1A).

When the air-conditioner (e.g., the air-conditioner 101 of FIG. 1A) receives an AI operation request through the communicator 530 of the air-conditioner (e.g., the air-conditioner 101 of FIG. 1A), the processor 550 of the air-conditioner (e.g., the air-conditioner 101 of FIG. 1A) may control the communicator 530 to transmit the operation information of the air-conditioner (e.g., the air-conditioner 101 of FIG. 1A) to an external device. 530 may be controlled. The processor 550 of the air-conditioner (e.g., the air-conditioner 101 of FIG. 1A) may control the communicator 530 to receive, from the external device, the estimated trouble item by reflecting the transmitted operation information to the learning model. The processor 550 may display a trouble item received through the communicator 530. The trouble item is a result of applying the operation information to the learned learning model to estimate a new trouble detection pattern associated with the trouble item based on the operation information of the air-conditioner (for example, the air-conditioner 101 of FIG. 1A).

FIG. 6 is a flowchart describing determination on degradation of a compressor according to rise in current using operation information of a compressor included in an air-conditioner by a trouble diagnosis server according to an embodiment.

The trouble diagnosis server 10 may determine degradation of the compressor using at least one of, for example, frequency, current, suction pressure and temperature, discharge pressure and temperature included in the acquired operation information of the air-conditioner.

Referring to operation 610, the trouble diagnosis server 10 may acquire the current value that is measured for three times using the obtained operation information. For example, the trouble diagnosis server 10 may acquire the current value that is measured in the 100 to 200 sec intervals.

Referring to operation 620, the trouble diagnosis server 10 may identify whether the discharge pressure measured in the same period as the period during which the current is measured is increased or decreased by 10% or more. If the change in the discharge pressure exceeds 10%, the trouble diagnosis server 10 may terminate the determination of whether the compressor is degraded or not.

Referring to operation 630, when the discharge pressure change is within 10%, the trouble diagnosis server 10 may identify whether the suction pressure change is within 10%. When the suction pressure change exceeds 10%, the trouble diagnosis server 10 may terminate the determination process for compression degradation without a further process.

Referring to operation 640, when the suction pressure change is within 10%, the trouble diagnosis server 10 may identify whether there is a change in operating frequency. If there is a change in the operating frequency, the trouble diagnosis server 10 may terminate the determination process for compression degradation without a further process.

Referring to operation 650, when there is no change in the operating frequency, the trouble diagnosis server 10 may identify whether the last measurement, among the current measurement, is greater than or equal to the 1.4 times of the average value of the previous measurement of two times.

When the last current measurement is greater than or equal to the value which is 1.4 times higher than the average value of the previous measurement of two times, it may be determined that there is high possibility of compressor degradation. If the last current measurement is less than the value which is 1.4 times higher than the average value of the previous measurement of two times, the trouble diagnosis server 10 may terminate the determination process for compressor degradation without a further process.

The trouble diagnosis server 10 may identify whether there is a trouble in an element of the air-conditioner using a change in various items included in the operation information of the air-conditioner.

Figure 7:
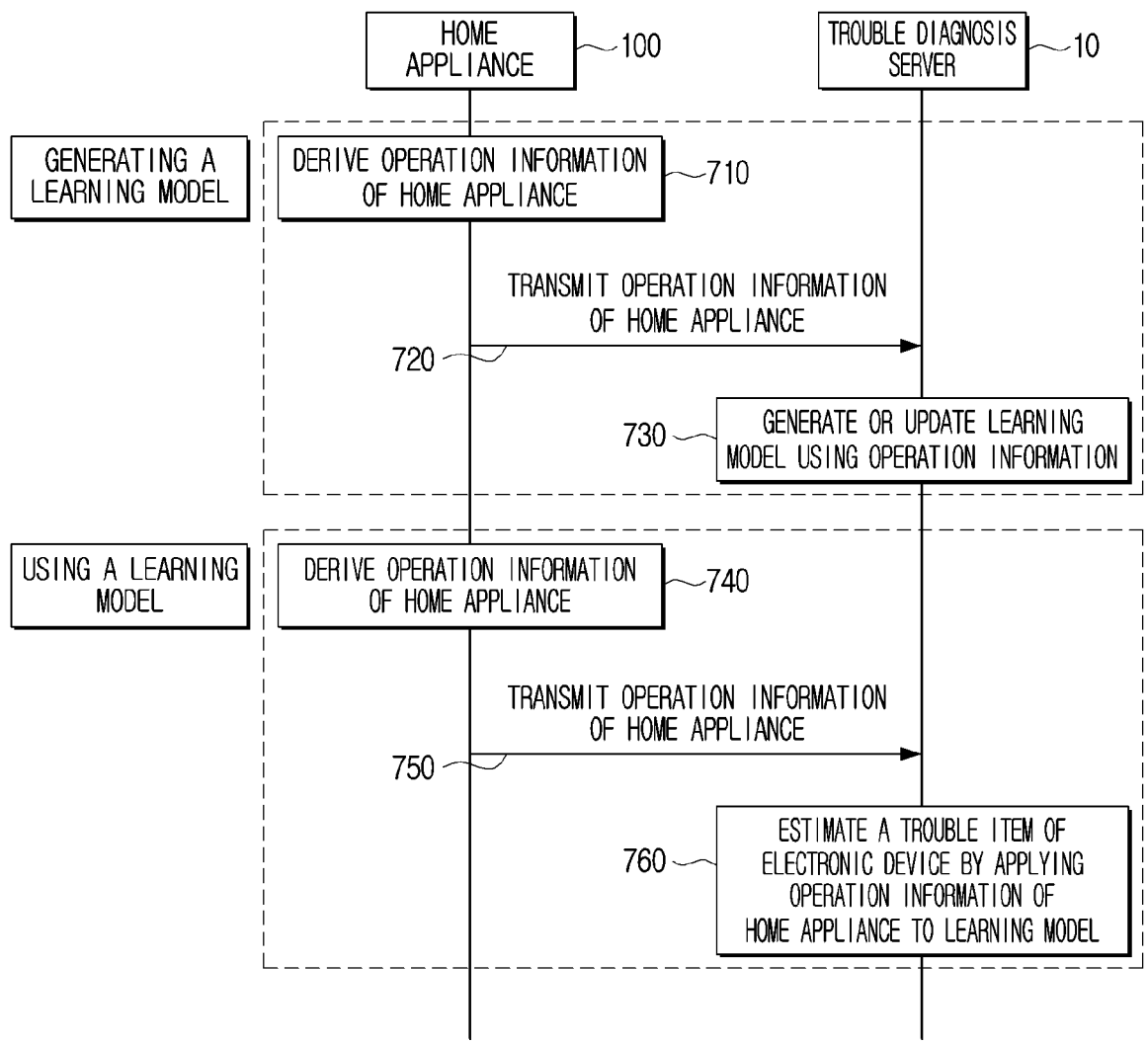
FIG. 7 is a flowchart to describe that a trouble diagnosis server generates a learning model and estimates a trouble of a home appliance using a learning model according to an embodiment.

FIG. 7 is a flowchart to describe that a trouble diagnosis server generates a learning model and estimates a trouble of a home appliance using a learning model according to an embodiment.

Referring to operation 710, the home appliance 100 may derive operation information of the home appliance 100. The home appliance 100 may derive the product information of the home appliance 100.

According to an embodiment, the product information of the home appliance 100 may be at least one of a type of the home appliance (for example, the air-conditioner, washing machine, refrigerator, robot cleaner, or the like), product identifier (for example, manufacturing number, manufacturing name, manufacturing date, or the like), or trouble history (for example, error code generation, motion hold, or the like).

The operation information of the home appliance 100 may be at least one of, for example, operation history (e.g., set driving mode, periodically-measured driving mode frequency), performance information (for example, periodically-measured operation efficiency), current measurement, frequency measurement, temperature measurement (for example, temperature inside the home appliance, temperature outside the home appliance, or the like), pressure measurement, vibration measurement, or the like.

Referring to operation 720, the home appliance 100 may transmit the derived operation information of the home appliance 100 to the trouble diagnosis server 10. The home appliance 100 may transmit the derived product information of the home appliance 100 to the trouble diagnosis server 10.

According to an embodiment, the home appliance 100 may transmit the derived operation information to the data learning server 30, trouble diagnosis server 10, or a third device (for example, AP) in communication with the data learning server 30.

Referring to operation 730, the trouble diagnosis server 10 may generate or update the learning model trained to estimate a new trouble detection pattern related to a trouble item of the home appliance using the received operation information. According to various embodiments, the trouble diagnosis server 10 may generate or update the learning model by using the product information of the home appliance 100.

Referring operation 740, the home appliance 100 may derive the operation information of the home appliance 100.

Referring to operation 750, the home appliance 100 may transmit the derived operation information to the trouble diagnosis server 10.

Referring to operation 760, the trouble diagnosis server 10 may apply the received operation information to the learning model to estimate the trouble item of the home appliance.

Figure 8:
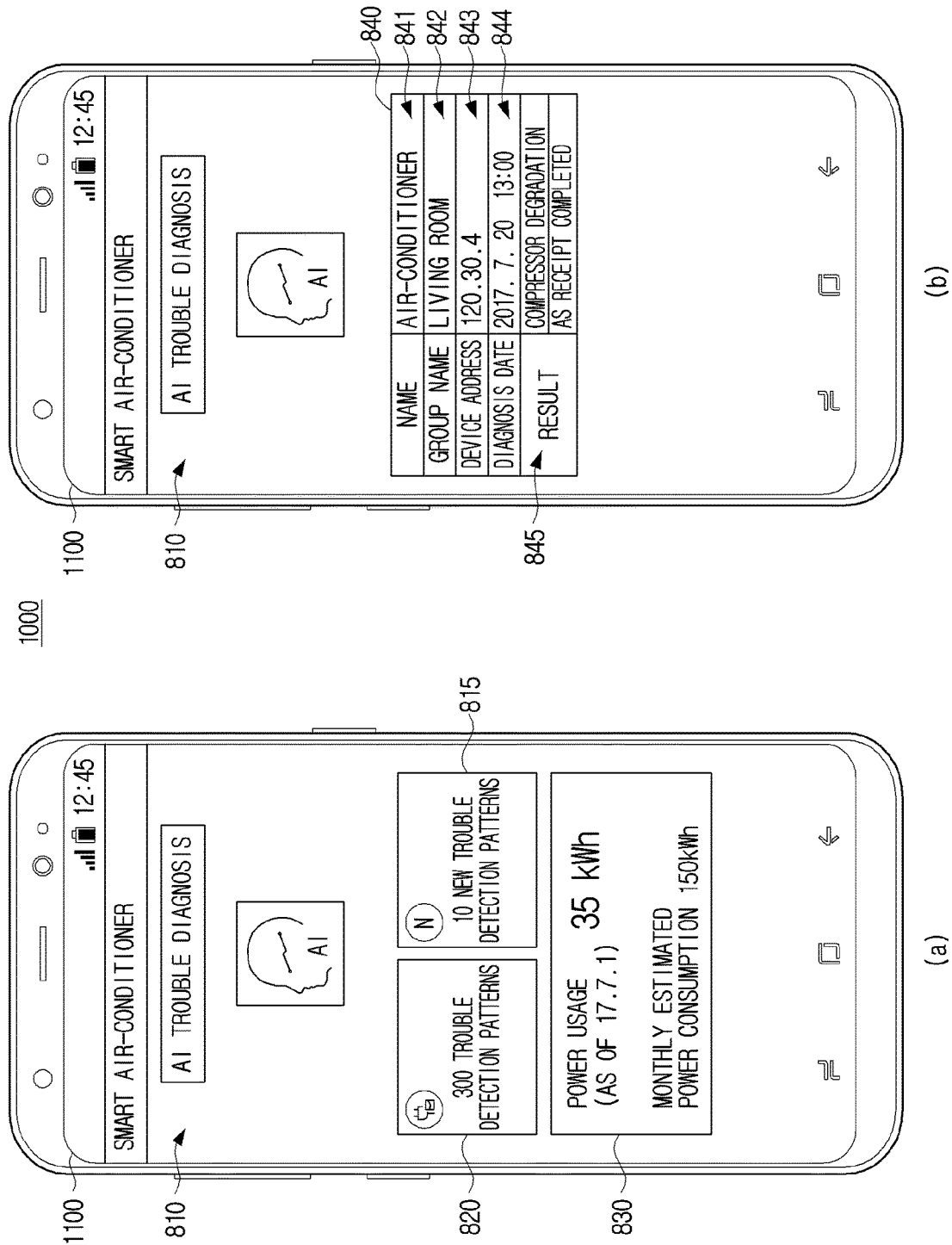
FIGS. 8A and 8B are views to describe that a user terminal displays information on a newly-generated trouble detection pattern and a trouble item according to an embodiment.

FIGS. 8A and 8B are views to describe that a user terminal displays information on a newly-generated trouble detection pattern and a trouble item according to an embodiment.

Referring to FIGS. 8A and 8B, the user terminal 1000 may execute an application for controlling the air-conditioner 101 in response to a user's input.

The application for controlling the air-conditioner 101 may display a user interface 810 capable of manipulations such as on/off of the air-conditioner 101, selection of the operation mode of the air-conditioner 101, AI operation selection, wind intensity setting, reservation setting, AI trouble diagnosis identification, or the like.

When the user interface 810 is out of a viewport range of the display 1100 included in the user terminal 1000, the user may display the user interface out of the viewport range to be within the viewport range by using a dragging gesture.

Referring to FIG. 8A, the user terminal 1000 may receive information related to the new trouble detection pattern associated with the trouble of the air-conditioner 101 from the trouble diagnosis server and display the same on the display 1100.

For example, the user terminal 1000 may display the number 815 of newly added trouble detection patterns on the display 1100 in response to a user input executing an AI trouble diagnosis function. That is, the user terminal 1000 may transmit a user input for selecting the AI trouble diagnosis function to the diagnosis server 10. The trouble diagnosis server 10 may transmit information related to the newly added trouble detection pattern to the user terminal 1000. The user terminal 1000 may display information associated with the received newly added trouble detection pattern (e.g., the number 815 of newly added trouble detection patterns).

According to various embodiments, the trouble diagnosis server 10 may transmit the number 825 of the trouble detection patterns newly added by the trouble diagnosis server 10 to the user terminal, in accordance with a predetermined cycle (for example, 30 days). The user terminal 1000 may display the received number 815 of the trouble detection patterns on the display 1100.

According to an embodiment, an application for controlling the air-conditioner 101 may display existing number 820 of the trouble detection patterns, and the number 815 of the newly-added trouble detection patterns on the display 1100 at the same time.

According to various embodiments, the application for controlling the air-conditioner 101 may display the newly-added trouble detection pattern and the associated trouble item (not shown) together.

According to an embodiment, the application for controlling the air-conditioner 101 may display the history of use of a general air-conditioner such as power usage 830 and use state, or the like.

Referring to FIG. 8B, the user terminal 1000 may receive the trouble of the air-conditioner 101 from the trouble diagnosis server and display the same on the display 1100.

For example, the user terminal 1000 may display the trouble diagnosis result in the display 1100 in response to a user input executing an AI trouble diagnosis function. That is, the user terminal 1000 may transmit a user input selecting an AI trouble diagnosis function to the processor (e.g., the processor 550 of FIG. 5) of the air-conditioner 101 or the trouble diagnosis server 10. The processor (e.g., processor 550 of FIG. 5) of the air-conditioner 101 or the trouble diagnosis server 10 may transmit the diagnosis result to the user terminal 1000 to perform a trouble diagnosis. The user terminal 1000 may display the received trouble diagnosis result 840.

According to various embodiments, the trouble diagnosis server 10 or the processor (e.g., the processor 550 of FIG. 5) of the air-conditioner 101 may automatically perform trouble diagnosis for the air-conditioner 101 in accordance with a predetermined cycle (for example, ten days), and transmit the result to the user terminal 1000. The user terminal 1000 may display the received trouble diagnosis result 840.

According to an embodiment, the user interface 810 for controlling the air-conditioner 101 may display the trouble diagnosis result 840. The trouble diagnosis result may display, for example, a name 841 of the home appliance subject to trouble diagnosis, a group name 842 to which the home appliance subject to trouble diagnosis belongs to on the network, a network address 843 of the home appliance subject to trouble diagnosis, diagnosis time 844, or result 845.

For example, as a result of the trouble diagnosis, when it is determined that the trouble likelihood is high, the user interface 810 for controlling the air-conditioner 101 may display the trouble item with high possibility (for example: compressor degradation) and display the result (for example, after service (A/S) request, or the like) taken by the trouble diagnosis server 10.

The trouble diagnosis server 10 according to an embodiment may improve the probability of predicting trouble occurrence using the newly-estimated trouble detection pattern. As a result, inconvenience of a user who uses a home appliance may be minimized.

The embodiments may be implemented as S/W program including an instruction stored in a computer-readable storage media.

A computer is a device which calls instructions stored in a storage medium and is capable of operating according to an embodiment according to the called instructions, and may include the trouble diagnosis server according to the embodiments.

A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

The controlling method according to the embodiments may be provided in a computer program product. The computer program product may be traded between a seller and a purchaser as a commodity.

A computer program product may include a software program (S/W) and a computer readable storage medium having stored therein a software program. For example, a computer program product may include a product (e.g., a downloadable app) in the form of a S/W program electronically distributed through an electronic market (e.g. Google Play Store, App Store) or a manufacturer of the trouble diagnosis server. For electronic distribution, at least a portion of the S/W program may be stored on a storage medium or may be created temporarily. In this case, the storage medium may be a server of a manufacturer, a server of an electronic market, or a storage medium of a relay server for temporarily storing an SW program.

The computer program product may include a storage medium of a server or a storage medium of a home appliance in a system configured by a server and a home appliance. Alternatively, when there is a third device (e.g., a smart phone) communicatively coupled to a server or a home appliance, the computer program product may include a storage medium of the third device. Alternatively, the computer program product may include the S/W program itself transmitted from the server to the home appliance or the third device, or from the third device to the home appliance.

In this case, one of the server, the home appliance, and the third device may execute the computer program product to perform the method according to the embodiments. Alternatively, two or more of the server, the home appliance, and the third device may execute the computer program product to distribute the method according to the disclosed embodiments.

For example, a server (e.g.: a cloud server or an AI server, etc.) may run a computer program product stored on a server to control the home appliance connected to the server to perform a method according to the disclosed embodiments.

As another example, the third device may execute a computer program product to control the home appliance connected to and communicating with the third device to perform the method according to the disclosed embodiment. When the third device executes the computer program product, the third device can download the computer program product from the server and execute the downloaded computer program product. Alternatively, the third device may execute a computer program product provided in a preloaded manner to perform the method according to the disclosed embodiments.

What is claimed is:

1. A data learning server comprising:
    a communicator communicatively connected to a plurality of external devices, the plurality of external devices comprising a home appliance;
    a learning data acquisition unit configured to acquire, via the communicator, product information of the home appliance and operation information of the home appliance;
    a model learning unit configured to update a neural network model using the product information and the operation information of the home appliance, wherein the neural network model is trained to output one or more trouble items based on the product information and the operation information; and
    a processor configured to provide the product information and the operation information to the neural network model trained to obtain a trouble item of the home appliance,
    wherein the model learning unit is configured to:
        detect a trouble history related to the obtained trouble item in the operation information,
        identify the operation information for a predetermined period at a time when the trouble history is detected,
        identify a trouble detection pattern based on the identified operation information exceeding a predetermined number of times, and
    wherein the processor is configured to:
        update the trouble detection pattern related to the obtained trouble item, and
        provide, to the home appliance, information with respect to trouble occurring in the home appliance in advance of the trouble occurring.

2. The data learning server of claim 1, wherein the product information of the home appliance comprises at least one of a type, a manufacturing number, a product name, or a manufacturing date of the home appliance,
    wherein the operation information of the home appliance comprises at least one of a driving mode set to the home appliance, frequency of the driving mode, performance information of the home appliance, a current measurement, a frequency measurement, a temperature measurement, a pressure measurement, or a vibration measurement.

3. The data learning server of claim 1, wherein the learning data acquisition unit further obtains position information of the home appliance,
   wherein the model learning unit updates the neural network model using the product information, the operation information, and the position information.

4. The data learning server of claim 1, wherein the trouble detection pattern comprises a time-dependent change in at least one variable of operation information.

5. The data learning server of claim 1, wherein the home appliance is an air-conditioner comprising an electrically powered compressor and at least one sensor configured to measure an electrical current drawn by the compressor over time.

6. The data learning server of claim 1, wherein the operation information comprises data of an electrical current drawn by a compressor over a time period.

7. The data learning server of claim 6, wherein a first trouble detection pattern comprises a slope of a curve of current change over time.

8. The data learning server of claim 6, further comprising receiving, from the external device, a first trouble pattern comprising a slope of a curve of current change over time.

9. A data learning server comprising:
   a communicator communicatively connecting the data learning server to a home appliance;
   a processor; and
   a memory containing instructions, which, when executed by the processor, cause the data learning server to:
      acquire, from the home appliance, product information of the home appliance and operation information of the home appliance,
      provide the operation information and the product information to a neural network model to determine a trouble item of the home appliance,
      update the neural network model using the product information and the operation information of the home appliance, wherein the neural network model is trained to output one or more trouble items based on the product information and the operation information,
      detect a trouble history related to the trouble item in the operation information,
      identify the operation information for a predetermined period at a time when the trouble history is detected,
      identify a trouble detection pattern based on the identified operation information exceeding a predetermined number of times,
      update the trouble detection pattern related to the trouble item, wherein the trouble detection pattern comprises one or more items of information associated with a trouble item, and
      transmit the determined trouble item to an external device,
   wherein the processor is configured to provide, to the home appliance, information with respect to trouble occurring in the home appliance in advance of the trouble occurring.

10. The data learning server of claim 9, wherein instructions, when executed by the processor, further cause the communicator to transmit, to the external device, information associated with the updated trouble detection pattern.

11. The data learning server of claim 9, wherein the information associated with the updated trouble detection pattern comprises at least one of a number of new trouble detection patterns, and a trouble item related to the new trouble detection pattern.

12. The data learning server of claim 9, wherein the data learning server, based on receiving a signal requesting information related to the updated trouble detection pattern, controls the communicator to transmit information associated with the updated trouble detection pattern to the external device, wherein the signal is received at a preset interval.

* * * * *